United States Patent [19]

Iura et al.

[11] Patent Number: 4,767,433

[45] Date of Patent: Aug. 30, 1988

[54] SPHERICAL SILICA GLASS POWDER PARTICLES AND PROCESS FOR THEIR PRODUCTION

[75] Inventors: Jun-ichi Iura, Yokohama; Toshiyasu Kawaguchi, Atsugi, both of Japan

[73] Assignee: Asahi Glass Company Ltd., Tokyo, Japan

[21] Appl. No.: 51,769

[22] Filed: May 20, 1987

[30] Foreign Application Priority Data

May 22, 1986 [JP]  Japan ................................. 61-116129
Oct. 31, 1986 [JP]  Japan ................................. 61-258549

[51] Int. Cl.⁴ ....................... C03B 19/06; C03B 19/10
[52] U.S. Cl. .................................... 65/21.1; 65/18.1; 65/901; 501/12
[58] Field of Search ................. 65/17, 18.1, 901, 21.1; 501/12; 423/338

[56] References Cited

U.S. PATENT DOCUMENTS 3,799,754  3/1974  Thomas .................................. 501/12
4,006,175  2/1977  Termin .................................. 423/338

FOREIGN PATENT DOCUMENTS 61-58820  3/1986  Japan .................................. 423/338
61-58819  3/1986  Japan .................................. 423/338

Primary Examiner—Kenneth M. Schor
Attorney, Agent, or Firm—Oblon, Fisher, Spivak, McClelland & Maier

[57] ABSTRACT

A spherical silica glass powder particle having projections of network pattern on its surface is produced by gel-route formation.

7 Claims, 1 Drawing Sheet

X 5,000

SPHERICAL SILICA GLASS POWDER PARTICLES AND PROCESS FOR THEIR PRODUCTION

BACKGROUND OF THE INVENTION

1. Field of the Invention

The present invention relates to highly pure spherical silica glass powder particles, a process for their production and a method of their use.

2. Discussion of Background

Heretofore, it has been common to air-tightly seal semiconductor devices with an epoxy resin composition containing not higher than 70% by weight of silica glass powder.

In recent years, silica glass powder having a high purity has been required as semiconductor devices tend to be highly integrated, since α-ray particles generated from impurities cause noises. For example, it is required that impurities such as uranium and thorium be not higher than 1 ppb, and impurities such as aluminum, sodium, iron and chlorine be not higher than 1 ppm.

On the other hand, a sealing composition containing a higher content of silica glass powder is desired to improve the strength of the sealing portion in order to cope with the trend for large size semiconductor devices. However, if the content of silica glass powder is simply increased, there will be problems such that the strength of the sealing portion is likely to deteriorate, the air-tightness is likely to be impaired, and a residual stress is likely to be created. To solve such problems, spherical silica glass powder particles are desired.

Heretofore, silica glass powder having a high purity has been produced by pulverization of a natural rock crystal of high guality. However, because of restrictions with respect to the purity of the starting material, the inclusion of impurities during the pulverization step and the availability of the resource, various new processes have been attempted.

One of them is a process wherein silica glass powder having a low content of impurities is produced by using water glass as the starting material. Namely, Japanese Unexamined Patent Publication No. 54632/1984 discloses that highly pure silica glass powder can be obtained by conducting the reaction of water glass with a mineral acid at a hydrogen ion concentration within a certain specific range. However, this process has drawbacks such that a number of washing steps are required in order to remove the impurities, that after the drying, powder particles are likely to aggregate and it is necessary to take an additional step for disintegrating the aggregates to obtain silica glass particles having a proper granularity, and that a temperature as high as at least 1,100° C. is required to obtain silica glass powder.

Further, for the production of highly pure silica glass, a process has been known in which $SiCl_4$ is used as a starting material. Fine particles of silica glass used for the production of silica glass base material for optical fibers, are produced by using $SiCl_4$ as the starting material. Their particle sizes are within a range of from 100 to 2,000 Å, and it is common to heat-treat them to a size of from 10 to 100 μm for practical use. However, in this process, $Cl^-$ is likely to remain in the glass, which is not desirable for a sealing filler for semiconductor integrated circuits.

In recent years, an attention has been drawn to a sol-gel method wherein an alkoxide is used as a starting material for the production of silica glass having a high purity. Japanese Unexamined Patent Publications No. 205334/1982 and No. 2233/1983 propose a process which comprises spraying a sol solution obtained by the hydrolysis of a tetraalkoxysilane, to obtain silica powder, which is then heat-treated to obtain silica glass powder. According to this process, the size of silica powder particles formed by the spraying, varies depending upon the condition of the sol solution, whereby it is difficult to obtain silica glass powder having a desired particle size.

Heretofore, a process has been known wherein a silicon alkoxide is hydrolyzed in the presence of a basic catalyst to precipitate silica gel particles. However, this process has drawbacks such that the formed particles are primary particles having a size of submicrons or smaller, and their secondary particles obtained by aggregation have poor dispersebility and tend to be not spherical.

Further, Japanese Unexamined Patent Publication No. 176136/1983 discloses a process which comprises adding to an silicon alkoxide from 1 to 3 times by weight of water to prepare a solution, dispersing this solution in an organic solvent which is incompatible with the solution, thereby to precipitate silica gel, and separating and baking the silica gel to obtain silica glass powder.

However, this process has drawbacks such that the yield of spherical silica glass powder particles is not adequately high, and it is difficult to control the size of the powder particles, since it takes a long time for the reaction. Further, the silica glass powder obtained by this process has a smooth surface and thus has a drawback that when mixed with a resin and used for sealing a semiconductor device, the contacting surface with the resin is small, whereby it is difficult to obtain an adequately high sealing strength.

SUMMARY OF THE INVENTION

It is an object of the present invention to provide silica glass having a high purity and a certain specific surface pattern, and a process for producing such silica glass in good yield.

Another object of the present invention is to provide a method for using such silica glass powder.

The present invention provides a spherical silica glass powder particle having projections of network pattern on its surface.

The present invention also provides a process for producing spherical silica glass powder particles having projections of network pattern on their surface, which comprises hydrolyzing a silicon alkoxide with water in an amount of from 0.7 to 1.3 mols per mol of the silicon alkoxide in the presence of an acid and an alcohol, to form a sol of a partially condensed product of the silicon alkoxide; removing the alcohol from the sol to obtain a water-insoluble partially condensed product of the silicon alkoxide; dispersing the water-insoluble partially condensed product in water; treating the dispersion with a gelling agent to precipitate silica gel; and baking the precipitated silica gel.

Further, the present invention provides a method of use of spherical silica glass powder particles having projections of network pattern on their surface in admixture with a resin for sealing a semiconductor device.

DETAILED DESCRIPTION OF THE PREFERRED EMBODIMENTS

Figure 1:
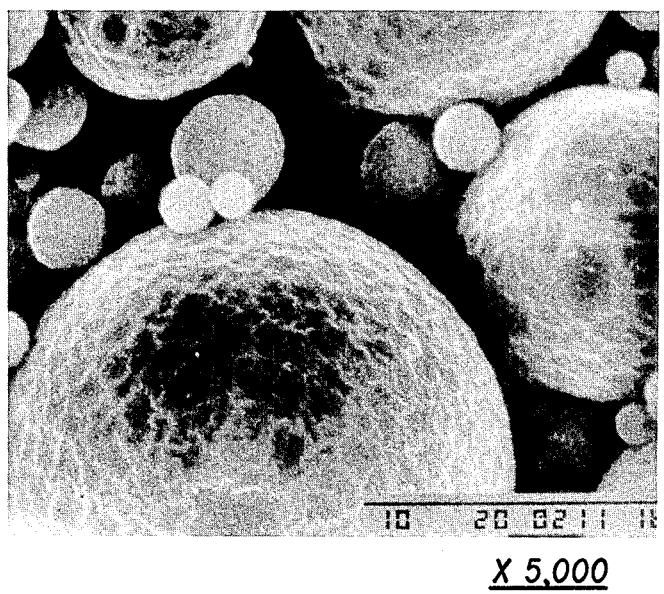
FIG. 1 is a scanning type electron microscopic photograph of silica glass powder prepared by the present invention.

In the present invention, the spherical powder particle means a particle wherein the ratio of the maximum diameter to the minimum diameter is within a range of from 1 to 1.5.

As shown in FIG. 1, the silica glass powder particles of the present invention have such a spherical shape, and have projections of network pattern on substantially their entire surface. The height of the projections is from 1/10 to 1/100 time the diameter of the powder particles, and the network pattern has a mesh size of from 0.5 to 5 μm. The size of the silica glass powder particles may be selected within a range of from submicrons to a few millimeters depending upon the particular purpose.

Such silica glass powder particles are particularly suitable as an additive to the resin for sealing semiconductor devices, since the contact surface area with the resin is large because of the special surface pattern, and the flowability will not be impaired even when incorporated into the resin in a substantial amount because of the spherical shape, and thus it is possible to improve the strength of the sealing portion.

Such silica glass powder particles can be prepared in the following manner. Firstly, a silicon alkoxide is hydrolyzed with water in an amount of from 0.7 to 1.3 mols per mol of the silicon alkoxide in the presence of an acid and an alcohol to obtain a sol of a partially condensed product of the silicon alkoxide. As the silicon alkoxide, an alkoxide having an alkyl group of less than 5 carbon atoms, such as a methyl group, an ethyl group, a propyl group or a butyl group, preferably a methyl group or an ethyl group, is preferred. If the alkyl group has a greater number of carbon atoms, the reactivity tends to be low, and it tends to be difficult to obtain spherical silica glass powder particles. If the amount of water used in the above reaction exceeds the above-mentioned range, gelation is likely to take place during the removal of the alcohol from the sol, and the resulting partially condensed product of the silicon alkoxide tends to be water-soluble, whereby the yield of silica glass powder will substantially decrease. On the other hand, if the amount of water is less than the above-mentioned range, the partially condensed product of the silicon alkoxide tends to be soluble in water during the dispersion of the partially condensed product in water, whereby the yield of silica glass powder will decrease, and it tends to be difficult to obtain spherical silica glass powder particles.

Within the above-mentioned range, the amount of the water is more preferably from 0.8 to 1.2 mols.

As such water, deionized water is usually employed in order to prevent inclusion of impurities.

The acid is a catalyst for the above reaction, and is effective to obtain a water-insoluble partially condensed product. If the amount of the acid is excessive, it remains as an impurity in the silica glass powder, such being undesirable. On the other hand, if the amount is too small, gelation is likely to take place during the removal of the alcohol. A preferred range of the acid is from $10^{-3}$ to $10^{-2}$ mol per mol of the silicon alkoxide.

As such an acid, an acid usually employed for hydrolysis may be employed. Specifically, hydrochloric acid, nitric acid and sulfuric acid may be mentioned. The alcohol is used to prevent the localization of the above reaction which may lead to gelation. The alcohol is used preferably in an amount of at least 1 mol per mol of the silicon alkoxide. An alcohol having less than 5 carbon atoms, such as methanol, ethanol, propanol or butanol, is preferred. If an alcohol having a greater number of carbon atoms is used, a water-soluble silicon alkoxide is likely to be formed. Among them, an alcohol having the same alkyl group as the alkyl group in the silicon alkoxide, is particularly preferred. In order to prevent inclusion of impurities, it is preferred to employ an alcohol having a high purity.

The above reaction can be completed by mixing the silicon alkoxide with the alcohol, adding water and an acid to this solution, and leaving the mixture to stand still for from 9 hours to a few tens hours. This reaction can be conducted at a temperature of from 0° C. to the boiling point of the alcohol. The higher the temperature, the higher the reaction rate. This reaction is an exotheramic reaction, and an adequately high reaction rate can be obtained without heating.

Then, the alcohol is removed from this sol to obtain a water-insoluble partially condensed product of the silicon alkoxide. This step is preferably conducted by distillation at a temperature within a range of from the boiling point of the alcohol to the boiling point of water. If the temperature of this distillation is lower than the boiling point of the alcohol, it becomes difficult to obtain spherical silica glass powder particles. On the other hand, if the temperature exceeds the boiling point of water, a part of the partially condensed product of the silicon alkoxide tends to evaporate, and the yield of the silica glass powder decreases.

If the removal of the alcohol is inadequate, the partially condensed product of the silicon alkoxide is likely to dissolve in water in the subsequent step of dispersing the partially condensed product in water, whereby the yield of the silica glass powder decreases. The remaining amount of the alcohol is preferably not higher than 1% by weight. In this step of removing the alcohol, a part of the acid is also removed.

The partially condensed product of the silicon alkoxide thus formed, is insoluble in water at a pH of 2 to 8. It has the following physical properties at 25° C. For instance, a partially condensed product of tetraethoxysilane has a specific gravity of from 1.105 to 1.20 and a viscosity of from 9.5 to 1,000 cps, and a partially condensed product of tetramethoxysilane has a specific gravity of from 1.20 to 1.40 and a viscosity of from 50 to 1,000 cps. Namely, there is a tendency that the more the number of carbon atoms in the alkyl group of the silicate, the lower the specific gravity and the voiscosity, and the larger the amount of the water, the higher the specific gravity and the viscosity.

Then, the partially condensed product is dispersed in water to precipitate silica gel in the presence of a gelling agent. This step is particularly important in the present invention, since the desired specific silica gel can be formed only when water is used as a dispersing medium and the partially condensed product is hydrolyzed in the dispersed state in water. The specific silica gel means silica gel having a smooth surface so that when it is baked, projections of network pattern will be formed on the surface.

In this step, it is usual that the partially condensed product is added to water, followed by stirring to disperse the condensed product in water. When a gelling agent is added in this state, the partially condensed product will undergo further hydrolysis and condensation to form spherical silica gel having a three demensional $SiO_2$ network. Such a condensation reaction will be completed in a few minutes at room temperature. After the completion of the condensation reaction, the stirring is stopped, and the reaction mixture is left to stand still, whereby the spherical silica gel precipitate.

The amount of water is preferably within a range of from 3 to 10 by volume relative to 1 of the partially condensed product.

If the amount of water is smaller than the above range, the dispersion tends to be viscous by the addition of the gelling agent, thus leading to the formation of a gel or aggregated gel, such being undesirable.

On the other hand, if the amount of water exceeds the above range, the dispersion of the partially condensed product tends to be inadequate, whereby it becomes difficult to obtain silica gel having a uniform particle size, and the volume of the dispersion will increase so that it takes a long time for the treatment, such being undesirable.

The particle size of the spherical silica gel is closely related to the size of the partially condensed product dispersed in water, and can be controlled by adjusting the size of the partially condensed product dispersed in water. For instance, it is determined by the stirring speed of the dispersion. Namely, if the stirring is vigorous, a dispersion of very fine particles will be obtained, and if the stirring is mild, a dispersion of particles having a size of a few millimeters will be obtained. The particle size distribution of the spherical silica gel is determined by the uniformity of the stirring. For instance, if the stirring is conducted by a stirrer having a relatively small diameter in a container having a large capacity, a not-well-agitated portion will be formed in the container, and the condensed product at such a portion tends to aggregate, whereby the particle size distribution of the resulting silica gel will be wide from a few micrometers to a few millimeters. To obtain silica gel having an average particle size of a few micrometers to a few tens micrometers, it is particularly effective to use a homogenizer.

When it is desired to obtain silica glass powder having a small particle size by using a partially condensed product having a high viscosity, it is preferred that the partially condensed product is mixed with an alcohol, and then dispersed in water. In such a case, the alcohol is used preferably in an amount not exceeding 1 by volume relative to the partially condensed product.

The gelling agent to be added after the dispersing operation is preferably a base, since the base serves to promote the condensation polymerization reaction. Such a base includes ammonia and ammonium hydrogencarbonate. Ammonia may be concentrated aqueous ammonia or ammonia gas. Ammonia gas is advantageous particularly when it is desired to uniformly disperse a substantial amount of the batch in a short period of time. The amount of the gelling agent to be added is preferably controlled so that the concentration of the gelling agent in water will be within a range of from 0.1 to 1N. If the amount is less than 0.1N, it takes a long time for gelation, and it will be necessary to continue stirring for a long period of time to obtain spherical silica gel. On the other hand, if the amount exceeds 1N, the gelation will be completed in a short period of time, and the silica sol turns into silica gel before the alcohol formed by the hydrolysis is adequately removed, whereby it is difficult to obtain spherical silica gel. Further, the concentration is so high that silanol groups on the surface of the spherical silica gels are likely to react with one another, and the precipitates tend to form a cake, whereby silica powder having inferior dispersibility will be obtained, such being undesirable. As the number of carbon atoms in the alkyl group of the silicon alkoxide increases, the rate of the hydrolysis changes from the one readily hydrolyzable to the one stable and hardly susceptible to hydrolysis. Accordingly, the concentration of the gelling agent is preferably adjusted to be low as the number of carbon atom decreases.

In order to avoid aggregation of the precipitated silica gel, the supernatant containing the gelling agent is removed, and the silica gel is preferably washed in the following order. Firstly, the precipitated silica gel is washed with water to dilute the gelling agent component remaining in the deposited silica gel. If the silica gel is dried with the gelling agent included, the silica gel turns into a cake as mentioned above. Then, the silica gel is washed with an acid to neutralize the gelling agent.

In the step of separating the supernatant from the precipitated silica gel, if the particle size of the silica gel is a few micrometers, filtration tends to be difficult because of a crosslinking phenomenone.

In such a case, it is preferred to conduct a solid-liquid separation by decantation. Natural sedimentation is not efficient because it takes a long time for sedimentation. It is effective to use a centrifugal separator to complete sedimentation in a short period of time.

In the foregoing manner, spherical silica gel is produced.

Now, the process for producing spherical silica glass powder particles by drying and baking the spherical silica gel will be described.

In the pores of the silica gel after the completion of the washing step, an aqueous alcohol solution is contained. The aqueous alcohol solution is evaporated to obtain porous spherical silica gel. Then, the silica gel is converted to silica glass by destroying the pores. Namely, the silica gel is baked in an oxidizing atmosphere at a temperature of from 1,000° to 1,200° C. for 15 minutes, whereby it is possible to obtain silica glass powder having a specific gravity of 2.2. By this baking, the particle size of the resulting silica glass will be smaller by about 40% than the particle size of the silica gel.

The silica glass powder particles thus obtained are susbtantially spherical and have projections of network pattern on their surface. Further, the silica glass is highly pure.

Accordingly, a composition obtained by mixing such silica glass powder particles with a resin, has a large contacting surface area as between the powder particles and the resin, and it has excellent flowability and contains no substantial impurities. Thus, the composition is suitable particularly for sealing semiconductor devices.

As the resin, an epoxy resin, a silicon resin or a polyphenylsulfide resin may be employed.

Further, the silica glass powder particles preferably have an average particle size of from 1 to 150 μm. If the particle size of the glass powder exceeds the above range, a stress is likely to be created in the resin in the vicinity of the glass powder particles, and cracks are likely to form, such being undesirable. On the other hand, if the size of the silica glass powder is less than the above range, the flowability of the composition tends to be low, and it becomes difficult to incorporate a substantial amount of the glass powder. Further, the airtightness is likely to be impaired because of the poor flowability. The height of the projections of the network pattern on the surface of the silica glass powder particle is preferably within a range of from 1/10 to 1/100 of the diameter of the particle. If the height of the projections is lower than the above range, the contacting surface area with the resin tends to be small, and the sealing strength tends to be low, such being undesirable. On the other hand, if the height of the projections is higher than the above range, the flowability tends to be low, such being undesirable. Within the above-mentioned range, the height of the projections is more preferably within a range of from 1/30 to 1/100 of the diameter of the powder particle.

The mesh size of the network pattern is preferably within a range of from 0.5 to 5 $\mu$m. If the mesh size is smaller than the above range, the resin tends to hardly flow into the recesses of the network parttern, and then the sealing strength tends to be low. On the other hand, if the mesh size of the network pattern exceeds the above range, the contacting surface area with the resin tends to be small, and the sealing strength tends to be low.

The silica glass powder particles in the composition have excellent flowability, and can be incorporated in an amount of up to 75% by weight.

Now, the present invention will be described in further detail with reference to Examples. However, it should be understood that the present invention is by no means restricted to such specific Examples.

EXAMPLE 1

To a mixture comprising 35 mols of tetraethoxysilane and 57 mols of ethanol, an aqueous nitric acid solution (comprising 35 mols of $H_2O$ and 0.035 mol of $HNO_3$) prepared by adding 35 cc of a 1N $HNO_3$ aqueous solution to 950 cc (33 mols) of $H_2O$, was added to obtain a partially condensed product of tetraethoxysilane. More specifically, a half amount of the aqueous nitric acid solution was dropwise added at a rate of 1.0 cc/min, and then, the hydrolysis and the condensation polymerization reaction were conducted for 24 hours at 20° C. Thereafter, the remaining half amount of the aqueous nitric acid solution was dropwise added in the same manner at a rate of 1.0 cc/min, and the mixture was left to stand for 24 hours at 20° C. The sol thus obtained was heated at a temperature of from 80° to 100° C., and the heating operation was continued until evaporation was no longer observed. The partially condensed product of tetraethoxysilane thus obtained had a specific gravity of 1.123 and a viscosity of 15.0 cps at 25° C. Further, the $SiO_2$ concentration was 45.4% by weight.

Together with 16 liters of deionized water, 4 liters of the partially condensed product of tetraethoxysilane was introduced into a polypropylene container. The partially condensed product of tetraethoxysilane and water were insoluble to each other and remained to be separated in two layers. A homogenizer (T.K. Homogenizer-SL Type, manufactured by Tokushu Kika Kogyo K.K.) was used, and the mixture was stirred at 8,500 rpm for 5 minutes to obtain an emulsified dispersion. Then, concentrated aqueous ammonia was added to the dispersion so that 16 liters of water became 1N aqueous ammonia, and gelation was conducted while stirring the mixture for 5 minutes. Then, the stirring was stopped, and the liquid was left to stand still for 15 hours to precipitate gel.

The supernatant was decanted, and the precipitated gel was washed with 2 liters of deionized water. Then, the silica gel was precipitated again over a period of 15 hours, and the major portion of the supernatant was again decanted. Then, the washing with 2 liters of a 1N nitric acid aqueous solution, the precipitation and the solid-liquid separation were repeated in the same manner, and thereafter, the precipitated silica gel was dried at 60° C. for 12 hours. The dried product was baked in a furnace at 1,180° C. for 30 minutes under a gas stream of $N_2/O_2=4/1$, to obtain spherical silica glass powder particles having a specific gravity of 2.2. The silica glass powder particles had the following particle size distribution. Namely, the average diameter was 8 $\mu$m, and the diameter at which the cumulative weight reached 10% of the total, was 2 $\mu$m, where the cumulative weight is obtained by cumulating the weights of particles starting from particles having smaller particle sizes, and the diameter at which the cumulative weight reached 90% of the total, was 16 $\mu$m.

The yield of the silica glass powder was 98% based on the $SiO_2$ concentration in the partially condensed product of tetraethoxysilane. From the analysis of the concentrations of impurities in the silica glass powder, it was found that each of the alkali metal, the alkaline earth metal and the transition metal elements was not higher than 0.5 ppm, and the uranium concentration was 0.1 ppb.

From the observation of the surface of the silica glass powder particles by a scanning type electron microscope, the particles were found to have projections on their surface, as shown in FIG. 1, and the height of the projections was at least 1 $\mu$m with respect to the particles having a diameter of at least 10 $\mu$m. It was observed that the larger the diameter, the higher the height of the projections. The mesh size of the network pattern was about 2 $\mu$m.

On the other hand, with respect to the particles having a diameter of less than 10 $\mu$m, the height of the projections was about 1/10 of the diameter, and the mesh size of the network pattern was from 0.5 to 1 $\mu$m.

EXAMPLE 2

Spherical silica glass powder particles were prepared in the same manner as in Example 1 except that the rotational speed of the homogenizer was changed to 500 rpm.

With repect to this powder, the particle size distribution was measured in the same manner as in Example 1, and it was found that the average diameter was 18 $\mu$m, the diameter at which the cumulative weight reached 10% of the total, was 7 $\mu$m, and the diameter at which the cumulative weight reached 90% of the total, was 30 $\mu$m. Thus, the particles were larger than those in Example 1.

EXAMPLE 3

Into an alcohol solution obtained by adding methanol to tetramethoxysilane in an amount of 1.6 mols per mol of tetramethoxysilane, 1 mol time of a dilute nitric acid aqueous solution was poured, and tetramethoxysilane was subjected to hydrolysis. The entire amount was 600 cc. The nitric acid concentration was $1.6 \times 10^{-3}$ mol time relative to tetramethoxysilane. After the addition of the dilute nitric acid aqueous solution, the mixture underwent vigorous heat generation over a period of one hour. Upon expiry of about 48 hours after the completion of the heat generation, the sol thus obtained was heated for distillation at a temperature of from 65° to 82° C. to recover an aqueous methanol solution. The partially condensed product of tetramethoxysilane in the concentrated product was 51% by weight relative to the sol, and the specific gravity was 1.30.

Into a beaker having a capacity of 1,000 cc, 800 cc of deionized water was introduced, and 200 cc of the partially condensed product obtained in the above manner was further introduced. Then, the partially condensed product was dispersed in the deionized water by using the same homogenizer as used in Example 1 at a rotational speed of 6,000 rpm. The time for dispersion was about 40 seconds. Then, concentrated aqueous ammonia (15.2N) was added so that the deionized water became 0.1N aqueous ammonia, and the homogenizer was continuously rotated for further 20 seconds.

The subsequent operation was conducted in the same manner as in Example 1 to obtain spherical silica glass powder particles.

The spherical silica gel had a diameter of from 5 to 30 μm, and had good dispersibility.

The surface of the powder particles was observed in the same manner as in Example 1. The particles were found to have projections of network pattern on their surface, and the height and the mesh size of the projections of network pattern were similar to those given in Example 1. Further, the spherical silica glass powder had an average particles size of 8 μm, and the yield was about 98%.

EXAMPLE 4

A mixture comprising 1.48 mols of tetraethoxylsilane and 2.42 mols of ethanol (ethanol being 1.62 mols per mol of tetraethoxysilane) was maintained at 60° C., and an aqueous nitric acid solution comprising 29.5 cc of deionized water and 1.5 cc of a 1N $HNO_3$ aqueous solution, was dropwise added thereto at a rate of 0.1 cc/min, to conduct hydrolysis. The amount of water here was 1.15 mols per mol of tetraethoxysilane, and the amount of $HNO_3$ was 0.0015 mol per mol of tetraethoxysilane. The sol thus obtained was heated for distillation in the same manner as in Example 1 to obtain a partially condensed product of tetraethoxysilane having a $SiO_2$ concentration of 47% by weight, a viscosity of 17 cps and a specific gravity of 1.135 at 25° C.

Then, 60 cc of this partially condensed product of tetraethoxysilane and 40 cc of ethanol were mixed, and 400 cc of deionized water was further added thereto. Then, the mixture was introduced into a polypropylene container, and stirred and dispersed by a homogenizer (Milti-Purpose Laboratory Mixer, manufactured by Silverson Company) at 8,000 rpm for 3 minutes. Then, concentrated aqueous ammonia was added so that the water became 1N aqueous ammonia, and the mixture was stirred for 3 minutes. The subsequent operation was conducted in the same manner as in Example 1 to obtain spherical silica glass powder particles. The particle size distribution of this power was measured in the same manner as in Example 1, whereby the following results were obtained. Namely, the average diameter was 3.6 μm, the diameter at which the cumulative weight reached 10% of the total, was 1.3 μm, and the diameter at which the cumulative weight reached 90% of the total, was 6.9 μm. Thus, the powder particles were smaller than those in Example 1. The surface had projections of network pattern as in the case of Example 1.

EXAMPLE 5

Two liters of a partially condensed product of the tetraethoxysilane prepared in the same manner as in Example 1 and 18 liters of deionized water were introduced into a polypropylene container. Then, the mixture was stirred by the same homogenizer as used in Example 1 at 300 rpm for 5 minutes, and then concentrated aqueous ammonia was added so that 18 liters of the deionized water became 1N aqueous ammonia. Then, the mixture was stirred for 5 minutes. The subsequent operation was conducted in the same manner as in Example 1 to obtain silica glass powder particles. The powder particles were spherical, and the particle size distribution was as follows. Namely, the average diameter was 38 μm, the diameter at which the cumulative weight reached 10% was 22 μm, and the diameter at which the cumulative weight reached 90% was 90 μm.

The surface of the powder particles had projections of network pattern as in the case of Example 1.

This powder and the powder produced in Example 1 were mixed in a weight ratio of 8:2.

Then, the powder mixture was mixed with an epoxy resin so that the content of the powder mixture constituted 70% by weight. The composition thus obtained was heated to 170° C. to obtain a cured product. The flexural strength of this cured product was measured and found to be as high as 15 $kg/mm^2$.

COMPARATIVE EXAMPLE 1

A dilute nitric acid aqueous solution was dropwise added to an alcohol solution comprising 65 cc of tetraethoxysilane and 27 cc of ethano, and tetraethoxysilane was hydrolyzed. The amount of water dropwise added was 1.5 mols per mol of tetraethoxysilane, and the nitric acid concentration was $2.3 \times 10^{-3}$ mols per mol of tetraethoxysilane. Upon expiration of about 12 hours after the dropwise addition of the aqueous nitric acid solution, the sol thus obtained was heated to recover an aqueous ethanol solution. When 75.5 cc of the aqueous ethanol solution was recovered, the concentrated product was gelled in a few seconds.

COMPARATIVE EXAMPLE 2

Two mols of a dilute nitric acid aqueous solution was added to an alcohol solution comprising 1 mol of tetraethoxysilane and 1.65 mols of ethanol. Upon expiration of about 12 hours, the sol thus obtained was heated and concentrated. The concentration rate was 38% by weight relative to the weight of the original sol. The partially condensed product of tetraethoxysilane thus obtained was poured into deionized water in an amount of 4 times by volume whereupon the condensed product was immediately precipitated at the bottom in the form of a white continuous gel.

COMPARATIVE EXAMPLE 3

Tetraethoxysilane, deionized water, ethanol and hydrochloric acid were mixed to obtain a solution comprising 1 part by volume of tetraethoxysilane, 3 parts by weight of deionized water, 0.3 part by weight of ethanol and 0.02 part by weight of hydrochloric acid. Then, this solution was added to a paraffin at 70° C., and vigorously stirred for 15 minutes to precipitate silica gel powder particles. Then, the silica gel powder particles were separated and baked to obtain silica glass powder particles. From the observation of this powder particles by a scanning type electron microscope, no projection of network pattern was observed on the surface, and the surface was smooth. In this Comparative Example, the amount of water and the dispersing medium relative to tetraethoxysilane were different from those of the present invention.

COMPARATIVE EXAMPLE 4

Molten silica glass was pulverized in a ballmill to obtain silica powder particles having non-uniform shapes. These silica particles were formed into spherical particles in an oxygen-hydrogen flame. Silica glass particles thus obtained had an average diameter of 25 $\mu$m, and the particle size distribution was from 0.5 to 100 $\mu$m. Further, the surface of the particles were found to be smooth. These powder particles were mixed with an epoxy resin in the same manner as in Example 2, and the flexural strength of the cured product was measured and found to be 11 kg/mm$^2$. Thus, the strength was low, and the adhesion of the particles with the resin was not good. It is believed that this is because the surface condition of the powder particles was different from that of the present invention.

According to the present invention spherical silica glass powder particles having the special surface structure are provided.

In the production of such powder particles, the control of the particle size can readily be conducted, and spherical powder particles having a high purity can be produced in good yield.

Such powder particles have excellent flowability, and air-tight sealing can be assured even when such powder particles are incorporated in a substantial amount into a resin. By virtue of the special surface structure, the particles of the present invention provide excellent adhesion to the resin. Accordingly, high strength sealing can be accomplished by using a mixture of such powder particles and the resin. Further, such powder particles are free from generating noises attributable to impurities, and thus they are suitable for sealing highly integrated semiconductor devices.

What is claimed is:

1. A process for producing spherical silica glass powder particles having projections of network pattern on their surface, which comprises hydrolyzing a silicon alkoxide with water in an amount of from 0.7 to 1.3 mols of water per mol of the silicon alkoxide in the presence of an acid and an alcohol, to form a sol of a partially condensed product of the silicon alkoxide; removing the alcohol from the sol to obtain a water-insoluble partially condensed product of the silicon alkoxide; dispersing the water-insoluble partially condensed product in water; treating the dispersion with a gelling agent to precipitate silica gel; and baking the precipitated silica gel for sufficient time and at sufficient temperature to thereby provide said spherical glass powder particles.

2. The process according to claim 1, wherein the silicon alkoxide and the alcohol have the same alkyl group which is a methyl group, an ethyl group, a propyl group or a butyl group.

3. The process according to claim 2, wherein the acid is hydrochloric acid, nitric acid, sulfuric acid, and is used in an amount of from $10^{-3}$ to $10^{-2}$ mol per mol of the silicon alkoxide.

4. The process according to claim 1, wherein the sol is heated at a temperature of not higher than 100° C. to remove the water, the alcohol and the acid.

5. The process according to claim 1, wherein the amount of water in which the water-insoluble partially condensed product of the silicon alkoxide is dispersed, is from 3 to 8 times by volume the amount of the partially condensed product of the silicon alkoxide.

6. The process according to claim 1, wherein the gelling agent is concentrated aqueous ammonia, ammonia gas or ammonium hydrogencarbonate.

7. The process according to claim 1, wherein the precipitated silica gel is washed with water and an acid, and then baked.

* * * * *